United States Patent [19]

Buxbaum et al.

[11] Patent Number: 5,215,584
[45] Date of Patent: Jun. 1, 1993

[54] PROCESS FOR COLORING BUILDING MATERIALS

[75] Inventors: Gunter Buxbaum, Krefeld-Traar; Bernd Kröckert, Wesel, both of Fed. Rep. of Germany

[73] Assignee: Bayer Aktiengesellschaft, Leverkusen, Fed. Rep. of Germany

[21] Appl. No.: 775,483

[22] Filed: Oct. 15, 1991

[30] Foreign Application Priority Data

Oct. 24, 1990 [DE] Fed. Rep. of Germany ....... 4033825

[51] Int. Cl.$^5$ .............................................. C04B 14/02
[52] U.S. Cl. .................................. 106/712; 106/436; 106/453; 106/456
[58] Field of Search ................ 106/712, 436, 453, 456

[56] References Cited

U.S. PATENT DOCUMENTS 4,946,505 8/1990 Jungk .................................. 106/712

OTHER PUBLICATIONS

Patent Abstracts of Japan, vol. 10, No. 377 (D-392), (1986).
World Patents Index Latest, AN 85-200807, Derwent Publications LTD. 1985.

*Primary Examiner*—Mark L. Bell
*Assistant Examiner*—Chris Gallo
*Attorney, Agent, or Firm*—Connolly & Hutz

[57] ABSTRACT

Building materials such as plaster, lime-sand bricks, fiber cement parts, cast stones, roof tiles, flagstone and paving setts are colored by incorporating therein in organic granules produced from a suspension of one or more inorganic pigmenting agents and a hydrolyzed or poorly soluble compound of one or more ion types present per se as an essential constitutent in one or more pigments.

6 Claims, No Drawings

PROCESS FOR COLORING BUILDING MATERIALS

This invention relates to a process for coloring building materials with inorganic pigments in the form of granules.

BACKGROUND OF THE INVENTION

If they are to be given a colored finish, cement- and lime-bonded building materials, such as plasters, lime-sand bricks, fiber cement parts or cast stones, more particularly roof tiles and paving setts and also flagstones, are generally colored with inorganic pigments. Thus, it is standard practice in the building materials industry to use iron oxides or iron oxide hydroxides as red, black, brown or yellow pigments; manganese oxides as brown-black pigments; chromium oxides as green pigments and titanium dioxides as white pigments. Further examples of inorganic pigments are carbon blacks as black pigments, nickel or chromium rutiles as yellow pigments and cobalt-containing spinels as blue and green pigments, copper-containing spinels as black pigments and mixed crystals of barium sulfate and barium manganate as blue pigments.

For coloring concrete products, the pigments are normally used in powder form. In ground form, they have the advantage of ready dispersibility. Pigment powders are dispersed completely homogeneously in concrete mixtures in a short time of up to a few minutes. The disadvantage of fine powders is that they show poor flow behavior and often agglomerate and cake in storage. Exact metering is thus made difficult. Another disadvantage of certain powders is that they tend to emit dust.

It is known that these disadvantages in the pigmenting of concrete parts can be avoided by using aqueous pigment suspensions instead of dry pigment powders. These aqueous suspensions (pastes or slurries), which contain 30 to 70% by weight pigment, have never been widely used because the additional water content can give rise to considerably higher transport costs, depending on the distance from the factory to the user. In addition, the large quantity of water supplied with the slurry cannot be processed in every concrete preparation.

Accordingly, the building materials industry has largely continued to use dry pigment powders. Hitherto, the use of pigments in the form of microgranules, of the type known from the plastic and paint industries, has suffered because it was thought that granules would be less readily dispersible in concrete preparations. Poorly dispersible pigment agglomerates would require much longer mixing times. With the normally short mixing times widely used in the building materials industry, fish eyes, streaks or pigment agglomerates would occur at the surface of the concrete as a result of poor pigment distribution. The strength of color present in the pigment would not be developed, so that larger quantities of pigment would have to be used for the same color intensity of the concrete workpiece.

DE-C 36 19 363 describes pigment granules for coloring concrete products which consist essentially of pigment and one or more binder(s) promoting the dispersion of the pigment in the concrete. Binders which function as dispersion aids in concrete are said to include alkylbenzene sulfonate, alkyl naphthalene sulfonate, lignin sulfonate, sulfated polyglycol ethers, melamine/formaldehyde condensates, naphthalene/formaldehyde condensates, gluconic acid, salts of low molecular weight partly esterified styrene/maleic anhydride copolymers and copolymers of vinyl acetate and crotonic acid. The percentage content in the pigment is said preferably to be 2 to 6% by weight.

The dispersion aids mentioned act as liquefiers in concrete mixtures. They influence the water-to-cement ratio and, hence, the consistency of the concrete.

In the inorganic pigment itself, the binders added— as organic substances—represent foreign bodies.

According to DE-A 29 40 156, the inorganic starting pigment has a resin content of at least 20%. The dispersion of corresponding granules in concrete is seriously complicated by the resin components of hydrophobic agglomerates.

BRIEF DESCRIPTION OF THE INVENTION

The problem addressed by the present invention was to provide free-flowing, non-dusting inorganic pigment microgranules without any of the described disadvantages of the prior art for coloring building materials.

This problem has been solved by a process for coloring building materials with inorganic pigments in the form of granules, the granules being produced from a suspension of one or more pigments and a hydrolyzed compound and/or poorly soluble compounds of one or more ion types which is present per se as an essential constituent in one of the pigments.

DETAILED DESCRIPTION

It has surprisingly been found that the oxides and/or hydroxides formed, for example, by hydrolysis do not impede the dispersion of the pigments in concrete, but provide the granules with sufficient stability, so that dust emission is prevented and the granules are free-flowing.

The granules may be produced in the form of bead granules, for example in spray dryers or fluidized-bed dryers or granulators, or in the form of pellets in disk-type granulators, coating drums or comparable units known to the expert.

The compounds required for hydrolysis or precipitation may be added in the form of soluble salts or, in one particular embodiment, may be formed in situ by partial dissolution of the pigments. The pigments according to the invention preferably contain polyvalent cations of the transition elements.

Pigments containing polyvalent cations of the transition metals are preferred. Pigments containing titanium dioxide, iron oxide, chromium oxide, manganese oxide and/or zinc oxide are particularly preferred.

The hydrolysis or precipitation may be controlled either thermally or by addition of reagents showing an alkaline reaction or reagents which form poorly soluble compounds.

The quantity of compounds added in accordance with the invention may be from 0.05 to 5.0% by weight and is preferably from 0.1 to 1% by weight (expressed as oxide), based on pigment. Smaller quantities show poor activity while relatively large quantities can lead to dispersion problems.

It has been found that the granules according to the invention should not exceed a particle size dependent upon the pigment. This particle size depends primarily on the apparent density of the granules which, in turn, is a measure of the porosity of the particles. In the case of spray granulation, porosity is in turn dependent upon the solids content of the pumpable starting suspension before drying which may vary considerably in dependence upon the particle shape and size of the pigment. The compacted bulk volume or compacted bulk weight defined in DIN 53 194 (August 1957) is a measure of the apparent density. The pigment granules according to the invention are distinguished by the fact that they do not disintegrate during measurement of the compacted bulk weight. The granules according to the invention preferably have a compacted bulk weight of 0.5 to 2.5 g/cm$^3$ and, more preferably, from 0.8 to 1.5 g/cm$^3$.

The particle size should not be too small either because the fines below about 50 μm in size (dependent on the properties of the pigment) are responsible for the emission of dust from a dry powder. In addition, flow behavior deteriorates with an increasing percentage of fines.

The granules according to the invention have an average particle size of 50 to 500 μm and preferably in the range from 100 to 300 μm.

Pigment granules having this particle size are non-dusting, free-flowing powders which are stable to handling and which are particularly suitable for coloring building materials. Contrary to previous opinion (DE-C 36 19 363), the shear forces applied to the granules in concrete preparations are sufficient for completely dispersing the pigment during the mixing cycle.

Particularly good results are obtained with iron oxide pigments.

The compacted bulk weight of the granules can vary according to the pigment, the method and quantity of addition and the water content of the suspension. Low compacted bulk weights lead to unstable granules while high compacted bulk weights lead to poor dispersibility. The black iron oxide granules according to the invention preferably have compacted bulk weights of 0.8 to 1.4 g/cm$^3$ while iron oxide red pigment granules preferably have compacted bulk weights of 1.2 to 1.6 g/cm$^3$.

The granules according to the invention normally contain around 1% by weight water. Depending on the fineness and particle shape of the pigments, the water content may be higher without adversely affecting flow behavior.

The following Examples are intended to illustrate the process according to the invention without limiting it in any way.

In the Examples, the determination of flowability as the flow time from a DIN-4-cup (DIN 53 211 of April, 1974) was analogously applied to the granules to be tested.

Dispersibility in concrete was tested by measurement of color intensity using prisms made with white cement on the basis of the following data: cement/quartz sand ratio 1:4, water/cement value 0.35, pigmenting level 1.2%, based on cement, mixer used from RK Toni Technik, Berlin, 5 liter mixing bowl, model 1551, rotational speed 140 r.p.m. (batch: 500 g cement). Four mix samples (300 g) were taken after 30, 40, 50, 60, 70 and 80 seconds and test specimens (5×10×2.5 cm) were produced therefrom under pressure (32.5 N/mm$^2$). Hardening of the test specimens: 24 h at 30° C./95% relative air humidity, followed by drying for 24 hours at 50° C. The color data were measured using a Hunterlab instrument: 3 measuring points on top and underneath, 24 measuring points per pigment mixture. The average values obtained were correlated with the sample taken after a mixing time of 80 s (final color intensity≠100%).

EXAMPLE 1

An aqueous suspension containing approx. 50% by weight Fe$_3$O$_4$ (Bayferrox 330, a product of Bayer AG) is adjusted to pH 2 with dilute H$_2$SO$_4$ at 30° C. and stirred for about 2 h. The pH value is then rapidly increased to 8-9 with 20% sodium hydroxide in order to hydrolyze the dissolved iron ions. The resulting suspension entered the hollow cone nozzle (spray angle 30°, bore 1.1 mm) installed in the dryer under a pressure of 4 bar. From the natural gas mantle burner, the combustion gases entered the spray dryer at a temperature of 480° C. The exit temperature of the gases was 140° C.

Iron oxide black pigment in the form of mechanically stable granules with an average particle size of 150 μm and a residual moisture content of approximately 2% by weight was obtained at an output of 20 kg/hour. The granules had a compacted bulk weight of 0.93 g/cm$^3$. Their flow behavior was very satisfactory. The test for dispersibility on concrete prisms by measuring the development of color intensity produced a final color intensity after a mixing time of 70 seconds.

EXAMPLE 2

0.5% by weight FeCl$_3$, based on the dry pigment, in the form of an aqueous solution was added to the iron oxide suspension of Example 1. Twice the equivalent quantity of ammonium bicarbonate solution was then added, followed by spray drying under the same conditions as in Example 1. Free-flowing, non-dusting granules were formed and could readily be incorporated in concrete.

EXAMPLE 3

A 55% slurry of a Cr$_2$O$_3$ pigment (Chromoxidgrün GN-M, a product of Bayer AG) was granulated in an Eirich disk-type granulator with addition of 0.7% by weight basic Cr sulfate in the form of a dilute aqueous solution.

The granules were dried at 200° C. Thereafter, no chromium could be detected in an aqueous extract. The granules were free-flowing and non-dusting and were readily dispersed in concrete.

What is claimed is:

1. A process for coloring building materials with inorganic pigments in the form of granules which comprises incorporating into the materials pigment granules produced from a suspension of one or more inorganic pigmenting agents and a hydrolyzed or poorly soluble compound of one or more ions present in the pigments.

2. A process as claimed in claim 1 wherein the inorganic pigments contain polyvalent cations of the transition elements.

3. A process as claimed in claim 1 wherein the pigmenting agent is titanium oxide, iron oxide, chromium oxide, manganese oxide or zinc oxide.

4. A process as claimed in claim 1 wherein the inorganic pigmenting agent is iron oxide pigment.

5. A process as claimed in claim 1 wherein said compound present in the granules amounts to 0.05 to 5% by weight, based on pigment.

6. A process as claimed in claim 5 wherein the amount of said compound is 0.1 to 1% by weight of pigment.

* * * * *